(12) United States Patent
Kallio et al.

(10) Patent No.: US 11,515,819 B2
(45) Date of Patent: Nov. 29, 2022

(54) STABILIZING DC LINK VOLTAGE WITH ADAPTIVE GAIN

(71) Applicant: ABB Schweiz AG, Baden (CH)

(72) Inventors: Samuli Kallio, Helsinki (FI); Erno Pentzin, Helsinki (FI); Mikko Vertanen, Helsinki (FI)

(73) Assignee: ABB SCHWEIZ AG, Baden (CH)

( * ) Notice: Subject to any disclaimer, the term of this patent is extended or adjusted under 35 U.S.C. 154(b) by 98 days.

(21) Appl. No.: 17/109,460

(22) Filed: Dec. 2, 2020

(65) Prior Publication Data

US 2021/0167707 A1 Jun. 3, 2021

(30) Foreign Application Priority Data

Dec. 2, 2019 (EP) .................................... 19212767

(51) Int. Cl.
*H02P 27/12* (2006.01)
*H02P 21/05* (2006.01)
*H02P 21/20* (2016.01)
*H02J 3/01* (2006.01)
*H02M 1/12* (2006.01)

(52) U.S. Cl.
CPC ............... *H02P 21/05* (2013.01); *H02J 3/01* (2013.01); *H02M 1/12* (2013.01); *H02P 21/20* (2016.02); *H02P 27/12* (2013.01); *H02P 2201/03* (2013.01)

(58) Field of Classification Search
CPC .......... H02P 21/05; H02P 21/20; H02P 27/12; H02P 2201/03; H02J 3/01; H02M 1/12
See application file for complete search history.

(56) References Cited

U.S. PATENT DOCUMENTS

2011/0222320 A1 9/2011 Delmerico et al.
2013/0214717 A1 8/2013 Ishikawa et al.
(Continued)

FOREIGN PATENT DOCUMENTS

CN 102638035 A 8/2012
CN 105745831 A 7/2016
(Continued)

OTHER PUBLICATIONS

European Patent Office, Extended Search Report issued in corresponding Application No. 19212767.8, dated May 18, 2020, 8 pp.
(Continued)

*Primary Examiner* — Rina I Duda
(74) *Attorney, Agent, or Firm* — Armstrong Teasdale LLP

(57) ABSTRACT

A method for stabilizing a DC link voltage of an electrical converter, the method including: determining a DC link voltage signal for the DC link voltage of the electrical converter; determining a fluctuation signal of the DC link voltage by applying a high pass filter to the DC link voltage signal; determining a torque offset by multiplying the fluctuation signal with a gain value; and modifying a reference torque with the torque offset for controlling the electrical converter. The gain value is adjusted by: determining a DC link voltage ripple from the DC link voltage signal; and comparing the DC link voltage ripple with a threshold and, when the DC link voltage ripple is higher than the threshold, increasing the gain value.

17 Claims, 2 Drawing Sheets

(56) References Cited

U.S. PATENT DOCUMENTS

2014/0312822 A1* 10/2014 Ooi .................. H02H 11/006
                                                        318/490
2014/0347896 A1* 11/2014 Chung ................ H02M 5/458
                                                         363/34
2017/0264225 A1    9/2017 Ishikawa et al.

FOREIGN PATENT DOCUMENTS

EP      2284986 A1    2/2011
WO   2009123268 A1   10/2009

OTHER PUBLICATIONS

Hinkkanen et al., "Control of Induction Motor Drives Equipped With Small DC-Link Capacitance," 2007 European Conference on Power Electronics and Applications, Aalborg; 2007, 10 pp.

\* cited by examiner

STABILIZING DC LINK VOLTAGE WITH ADAPTIVE GAIN

FIELD OF THE INVENTION

The invention relates to a method, a computer program, a computer-readable medium and a controller for stabilizing a DC link voltage of an electrical converter and for controlling an electrical converter. Furthermore, the method relates to an electrical converter system.

BACKGROUND OF THE INVENTION

In applications where an electrical converter is used for converting a DC voltage into a voltage to be supplied to an electrical machine, and the DC voltage is obtained by using a diode full-bridge rectifier, the DC voltage usually has some fluctuations. In particular, when the converter system is operated close or over its rated power, these fluctuations may become more severe.

With small powers, in symmetrical networks and all the three phases connected, the fluctuation may be of minor order and no corrective action is typically needed. However, if one of the supply phases is disconnected, the fluctuation may become huge. Fluctuations may also occur due to unbalanced line voltages or due to ringing of the capacitor circuit of the DC link (LC resonance phenomena). For these cases, when the fluctuations occur due to other reasons as a missing supply phase, it may be beneficial if the DC voltage is controlled as smooth as possible. This may not only affect the life time of the capacitors of the DC link but also the overall control performance.

US 2013/214717 A1 and US 2017/264225 A1 both relate to a controller for a motor converter, which evaluates a DC link voltage signal of a DC link supplying the motor converter. The DC link voltage signal is filtered with a high pass filter and the resulting signal is multiplied with two factors. One of the factors is determined from the filtered DC link voltage signal with the aid of a table. In the end, the modified signal is added to a q-component of a reference voltage.

EP 2 284 986 A1 describes an inverter controller, where a ripple component of a DC voltage is determined based on Fourier transformation.

DESCRIPTION OF THE INVENTION

It is an objective of the invention to effectively damp voltage fluctuations in a DC link of an electrical converter.

This objective is achieved by the subject-matter of the independent claims. Further exemplary embodiments are evident from the dependent claims and the following description.

An aspect of the invention relates to a method for stabilizing a DC (direct current) link voltage of an electrical converter. The method may be performed automatically by a controller of the electrical converter. This controller also may be adapted for controlling the electrical converter, for example by generating a switching signal for the electrical converter.

According to an embodiment of the invention, the method comprises: determining a DC link voltage signal for the DC link voltage in a DC link of the electrical converter; determining a fluctuation signal of the DC link voltage by applying a high pass filter to the DC link voltage signal; determining a torque offset by multiplying the fluctuation signal with a gain value; and modifying a reference torque with the torque offset for controlling the electrical converter. The cut off frequency of the high pass filter may be at least two times smaller than the grid frequency. For example, when the grid frequency is 60 Hz, the cut off frequency may be lower than 30 Hz.

The DC link voltage signal may be measured in the DC link. It has to be noted that the DC link voltage signal also may be a digitized signal. The high pass filter may be implemented by applying a low pass filter to the DC link voltage signal and subtracting the filter signal from the original DC link voltage signal. In general, the fluctuation signal may be a signal indicative of fluctuations in the DC link voltage, which fluctuations may be higher than a threshold frequency. The fluctuation signal may be a high frequency component signal.

The fluctuation signal is then multiplied with a gain value to generate a torque offset. The modification of the torque reference may be performed by subtracting the torque offset from the torque reference or by inverting the sign of the fluctuation signal and adding the torque offset to the torque reference.

The gain value is adjusted as described below in dependence of a voltage ripple in the DC link voltage. When the voltage ripple is high, the gain value is increased and/or when the voltage ripple is low, the gain value is decreased. With the torque offset, the torque of an electrical machine supplied by the converter may be adjusted to damp fluctuations in the DC link. In particular, with the torque offset, the power drawn from the DC link may be adjusted to damp these fluctuations.

According to an embodiment of the invention, the gain value is adjusted by: determining a DC link voltage ripple from the DC link voltage signal; and comparing the DC link voltage ripple with a threshold and, when the DC link voltage ripple is higher than the threshold, increasing the gain value. Analogously, the method may comprise: decreasing the gain value, when the DC link voltage ripple is lower than the threshold.

The DC link voltage ripple may be an indicator (which may be provided as a number and/or value) of the amount of fluctuations in the DC link voltage ripple. The DC link voltage ripple may be determined from the fluctuation signal. However, it also is possible that the DC link voltage ripple is determined from the DC link voltage signal directly. When the fluctuations are higher, the DC link voltage ripple value may be higher. The DC link voltage ripple may be determined from the DC link voltage signal by analysing its frequency spectrum. For example, the DC link voltage ripple may be determined by determining a magnitude of frequencies and/or a frequency band of the DC link voltage signal. It has to be noted that the threshold frequency, i.e. the cut off frequency, of the high pass filter for the fluctuation signal may be lower than a lowest frequency considered for the DC link voltage ripple.

The DC link voltage ripple also may be determined by taking an amount of samples and by calculating the difference between the minimum and the maximum values in that sample group.

When the DC link voltage ripple is higher than a threshold, the gain value may be increased. Analogously, when the DC link voltage ripple is smaller than the threshold, the gain value may be decreased.

It may be possible that the gain value is increased and/or decreased in several steps. When it is determined after a time that the DC link voltage ripple is still above the threshold, although the gain value has been increased, it may be increased even further. For example, the increment of the DC link voltage ripple may be performed with a constant increment value. Analogously, the increment of the DC link voltage ripple may be performed with the same constant increment value.

According to an embodiment of the invention, the gain value is at least increased to a maximal gain value. In general, the gain value may be restricted between a minimal and a maximal value. The minimal value of the gain value may be 0. In this case, no damping of the fluctuations may be performed at all. The maximal value may be a preset value.

According to an embodiment of the invention, the method further comprises: decreasing an output power limit of the electrical converter, when the maximal gain value is reached and the DC ripple does not decrease below a (for example second) threshold. This (second) threshold may be higher than or equal to the threshold mentioned above. A further measure for stabilizing the DC link is to decrease the overall output power of the converter. The output power limit may be a parameter set in the controller, which controls the possible maximal output power supplied to an electrical machine. For example, the maximal output power limit may be set to a value lower than 80% of the unadjusted maximal output power limit.

In the case of fluctuations that are not reducible by adjusting the gain, it may be assumed that one input phase of the electrical converter has been lost. In such a way, a loss of an input phase may be compensated by reducing the maximal output power.

According to an embodiment of the invention, the method further comprises: checking, whether a supply of the DC link from an electrical grid is lost, when the maximal gain value is reached and the DC link voltage ripple does not decrease the second threshold. For example, the input voltage of a rectifier for supplying the DC link may be measured and, when one or more of its input phase voltages are below a threshold voltage, it can directly be determined, whether the supply is at least partially lost.

In this case, i.e. when a partial loss of the supply has been detected, also the output power limit of the electrical converter may be decreased.

According to an embodiment of the invention, when the supply is lost, a fault signal is generated. When the supply is lost and the voltage ripple cannot be decreased, it is also possible that a fault signal is generated. In this case, the electrical converter system may be shut down.

According to an embodiment of the invention, the DC link voltage ripple is determined by Fourier transforming the DC link voltage signal and summing a band of frequencies from the transformed DC link voltage signal. The DC link voltage ripple may be calculated from a magnitude of frequency components of the DC link voltage signal. These magnitudes may be discretely integrated to determine the value of the DC link voltage ripple.

According to an embodiment of the invention, the fluctuation signal of the DC link voltage is determined by additionally applying a notch filter to the DC link voltage signal, wherein the notch filter is adjusted to remove a higher order harmonic of the grid frequency generated by a rectifier supplying the DC link. For example, when the rectifier is a three-phase rectifier with three half-bridges, it may generate 6th order harmonics. These harmonics may be filtered out with the notch filter to improve the quality of the fluctuation signal.

Analogously, the DC link voltage ripple may be determined, such that higher order harmonics of the grid frequency generated by the rectifier are excluded, when the DC link voltage ripple is calculated from the frequency spectrum of the DC link voltage signal.

According to an embodiment of the invention, the reference torque is at least one of: a q-component of a reference current, a torque reference of vector control or DTC, a q-axis current reference of vector control, a q-axis voltage reference of vector control, a flux reference of vector control or DTC, a d-axis current reference of vector control, a d-axis voltage reference of vector control, a frequency reference of scalar control, a voltage reference of scalar control. In general, every possible torque reference may be used. As an example, a current reference may be determined in the dq-system, which current reference is used for controlling the converter. The q-component is usually proportional to the torque of an electrical machine supplied by the converter. Thus, by adding the torque offset to the q-component, the torque and therefore the power drawn from the DC link may be controlled to damp DC link fluctuations.

A further aspect of the invention relates to a method for controlling an electrical converter. With the method, not only the DC link voltage but also the semiconductor switches of the electrical converter and in particular of an inverter converting the DC link voltage into an AC (alternating current) output voltage may be controlled.

According to an embodiment of the invention, the method comprises: determining an output voltage of the electrical converter; receiving a speed reference for an electrical machine supplied by the electrical converter; determining a torque reference from the speed reference; determining a torque offset by performing the steps of the DC link stabilization method and adding the torque offset to the torque reference; and controlling the electrical converter based on the torque reference.

The output voltage may be determined by measurement. The output voltage may be a multi-phase or three-phase voltage. From the measured output voltage and the speed reference, a torque reference may be determined, which is used for controlling the electrical converter and in particular for generating switching signals for the inverter. The torque reference may be the q-component of a reference current provided in the dq-system.

With the DC link stabilization method, a torque offset may be determined and this torque offset may be added to the torque reference used in the converter control method.

According to an embodiment of the invention, a switching signal based on pulse width modulation is determined from the torque reference and applied to the electrical converter. For example, space vector pulse width modulation may be used.

A further aspect of the invention relate to a computer program for stabilizing a DC link voltage and/or for controlling an electrical converter, which, when being executed by a processor, is adapted for performing the method as described in the above and in the following. For example, the computer program may be stored and/or executed in the controller of the electrical converter, which may have a processor and a memory.

A further aspect of the invention relates to a computer-readable medium in which such a computer program is stored. The computer-readable medium may be a memory of the controller. In general, a computer-readable medium may be a floppy disk, a hard disk, an USB (Universal Serial Bus) storage device, a RAM (Random Access Memory), a ROM (Read Only Memory), an EPROM (Erasable Programmable Read Only Memory) or a FLASH memory. A computer-readable medium may also be a data communication network, e.g. the Internet, which allows downloading a program code. In general, the computer-readable medium may be a non-transitory or transitory medium.

A further aspect of the invention relates to the controller for an electrical converter adapted for performing the method as described in the above and in the following. In particular, the controller may comprise a current control stage and/or a pulse width modulation stage. The current control stage may receive a speed reference and based on measurements in the converter system, such as an output voltage of the electrical converter and optionally the DC link voltage, may determine a torque and/or current reference. From the torque and/or current reference, the pulse width modulation stage may determine a switching signal, which is applied to the electrical converter and in particular its semiconductor switches.

A further aspect of the invention relates to an electrical converter system, which comprises a DC link with at least one capacitor, an inverter for converting a DC link voltage in the DC link into an AC output voltage to be supplied to an electrical machine and a controller, such as described above and below. The inverter may comprise one or more half-bridges composed of controllable semiconductor switches.

According to an embodiment of the invention, the electrical converter system further comprises a rectifier for rectifying an AC voltage from an electrical grid into a DC voltage supplied to the DC link. The rectifier may be a passive rectifier, which may be composed of one or more half-bridges composed of diodes.

According to an embodiment of the invention, the electrical converter system further comprises a rotating electrical machine supplied by the inverter. The rotating electrical machine may be a motor or generator.

It has to be understood that features of the method as described in the above and in the following may be features of the computer program, the controller and the converter system as described in the above and in the following, and vice versa.

These and other aspects of the invention will be apparent from and elucidated with reference to the embodiments described hereinafter.

BRIEF DESCRIPTION OF THE DRAWINGS

The subject-matter of the invention will be explained in more detail in the following text with reference to exemplary embodiments which are illustrated in the attached drawings.

The reference symbols used in the drawings, and their meanings, are listed in summary form in the list of reference symbols. In principle, identical parts are provided with the same reference symbols in the figures.

DETAILED DESCRIPTION OF EXEMPLARY EMBODIMENTS

Figure 1:
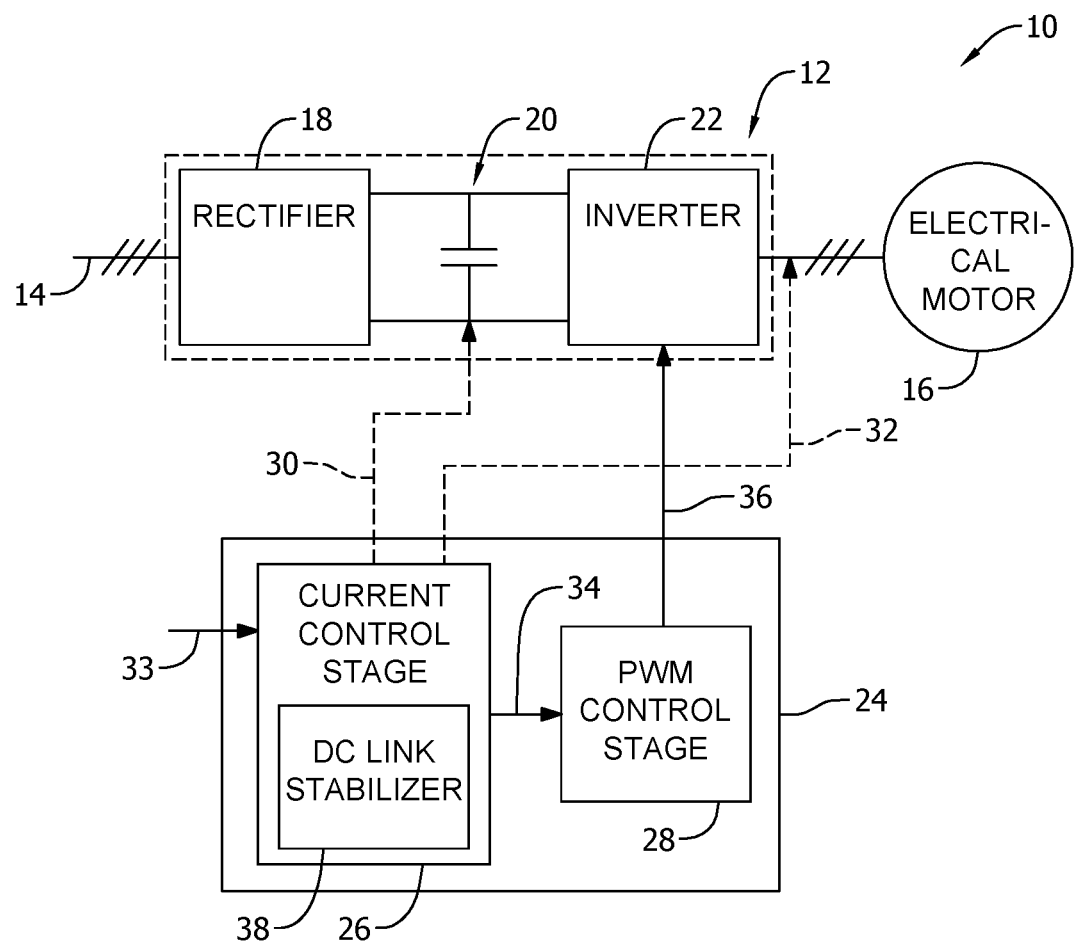
FIG. 1 schematically shows a converter system according to an embodiment of the invention.

FIG. 1 shows a drive system 10, which comprises an electrical converter 12, which is interconnected between an electrical grid 14 and an electrical machine 16, such as an electrical motor and/or generator.

The converter 12 comprises a rectifier 18 for rectifying an AC input voltage provided by the electrical grid. The input voltage may be a three-phase voltage and/or the rectifier 18 may be a passive three-phase rectifier. The rectified input voltage is then supplied to a DC link 20, which comprises one or more DC link capacitors.

An inverter 22 is connected to the DC link 20 and converts the DC link voltage to an AC output voltage, which is supplied to the electrical machine 16. The output voltage may be a three-phase voltage. The inverter 22 may comprise one or more half-bridges with controllable semiconductor switches.

The converter 12 and in particular the inverter 22 are controlled by a controller 24, which may comprise a current control stage 26 and a PWM (pulse width modulation) control stage 28. The controller 24 receives a DC link voltage signal 30 and output voltage signal 32 and a speed reference 33. The DC link voltage signal 30 and output voltage signal 32 may be provided by sensors measuring the respective voltages. The speed reference 33 may be provided by a superordinated controller.

From the speed reference 33, the DC link voltage signal 30 and the output voltage signal 32, the current control stage 26 determines a reference voltage 34, which is supplied to the PWM control stage 28. The PWM control stage 28 therefrom generates switching signals 36 with the aid of pulse width modulation. Internally, the current control stage 26 may determine a torque reference and/or current reference, from which the reference voltage 34 is calculated.

The current control stage 26 also comprises a DC link stabilizer 38, which will be explained with respect to FIG. 2. With the adaptive DC link stabilizer 38, DC voltage fluctuations in the DC link 20 may be automatically mitigated.

Figure 2:
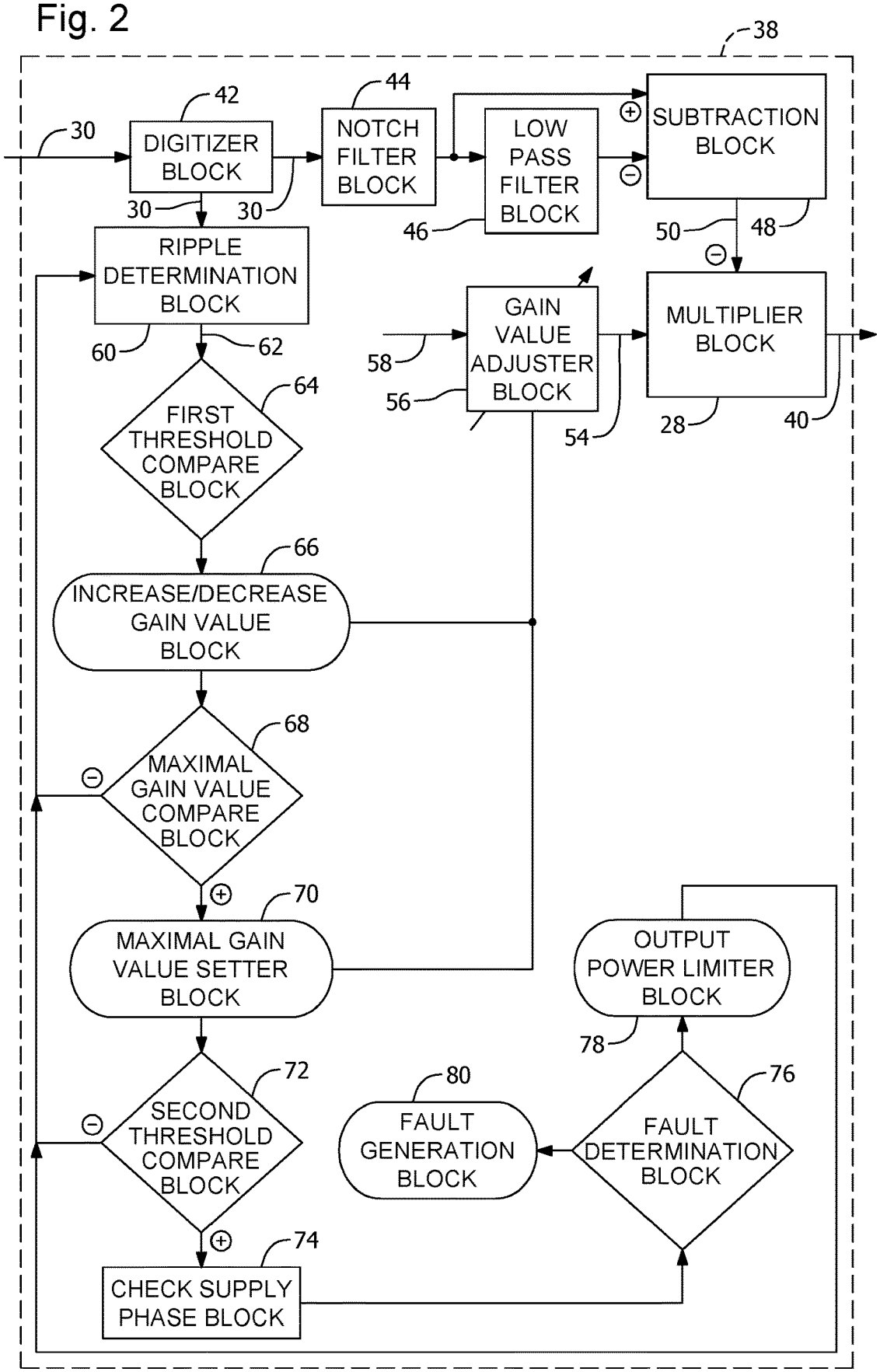
FIG. 2 schematically shows a block diagram of a controller according to an embodiment of the invention and illustrating a method according to an embodiment of the invention.

FIG. 2 shows control blocks of the DC link stabilizer 38, which also may be interpreted as methods steps of a method performed by the controller 24. In general, the DC link stabilizer 38 receives the DC link voltage signal 30 and outputs a torque offset 40. The torque offset is then added to a torque reference used in the controller 24, such as the q-component of a current reference.

The DC link voltage signal 30, which may be measured across the DC link 20, may be digitized in block 42. In block 44, a notch filter is applied to the DC link voltage signal 30 to remove a higher order harmonic of the grid frequency generated by a rectifier 18 supplying the DC link 20. For example, the frequency component of 6 times the grid frequency (such as 300 Hz or 360 Hz) is neglected on purpose by using the notch filter 44.

The following blocks 46 and 48 together may be seen as high pass filter, which is used for determining a fluctuation signal 50 of the DC link voltage. In block 46, a low pass filter is applied to the signal from block 44 to remove high frequency components and with block 48, the low pass filtered signal is subtracted from the signal filtered by block 44 and the result is inverted to form the fluctuation signal 50.

In block 52, the fluctuation signal 50 is multiplied with a gain value 54 to form the torque offset 40. As already mentioned, a reference torque is modified with the torque offset 40 for controlling the electrical converter 12.

The adaptive gain value 54 is provided by block 56, which may store the gain value 54. The gain value 54 may be increased and decreased dependent on a voltage ripple of the DC link, which will be described in more detail in the following. As shown in FIG. 2, the gain value 54 may be enabled and disabled, i.e. set to 0, when a corresponding signal 58 is received.

In block 60, a DC link voltage ripple 62, which may be a value, is determined from the DC link voltage signal 30, wherein the DC link voltage ripple 62 is determined from one or more frequency components of the DC link voltage signal 30. The DC link voltage signal 30 may be analysed with respect to its frequency content. For example, the DC link voltage ripple 62 may be determined by Fourier transforming the DC link voltage signal 30 and summing (and/or discrete integrating) a band of frequencies from the transformed DC link voltage signal 30. A lower frequency of the frequency band may be higher than a threshold frequency of the high pass filter 56, 58.

In block 64, the DC voltage ripple 62 is compared with a threshold. In general, the adaptive DC link stabilizer 38 may be activated only, if the DC voltage ripple 62 exceeds a threshold that may be needed to trigger an input phase loss fault. It may be that the DC link stabilizer 38 is by default in a stand-by mode and is activated only when the DC voltage ripple 62 exceeds a predefined threshold level. The stand-by mode may be present, when the gain value 54 is set to 0.

In block 66, when the DC link voltage ripple 62 is higher than the threshold, the gain value 54 is increased. The gain value 54 of the DC link stabilizer 38 may be increased in an adaptive manner to decrease a voltage ripple of the DC link voltage. It may be that the gain is increased, for example in several steps, as high as needed to have a smooth DC link voltage.

When the DC link voltage ripple 62 is lower than the threshold, then the gain value 54 may be decreased or set to 0. The DC link stabilizer 38 then continues with block 60.

It may be that the gain value 54 is limited from above and/or that the gain value is at least increased to a maximal gain value. To this end, in block 68, the gain value 54 is compared with a maximal gain value. When the gain value is higher as the maximal gain value, in block 70, the gain value 54 is restricted to the maximal gain value. Otherwise, the DC link stabilizer 38 continues in block 60.

When the maximal gain value has been reached, the DC link stabilizer 38 may also continue with block 72.

In block 72, the DC link voltage ripple 62 is compared with a second threshold, which may be higher or equal to the threshold used in block 64. When the DC link voltage ripple 62 is lower than the second threshold, the DC link stabilizer 38 continues at block 60. Otherwise, the following blocks/method steps are performed.

In block 74, supply phase loss function settings may be checked, which may be provided by other controller parts. In general, it may be checked, whether a phase of the supply of the DC link 20 from an electrical grid 14 is lost, when the maximal gain value is reached and the DC link voltage ripple 62 does not decrease below the threshold.

In block 76, based on the function settings determined in block 74, a low or disabled grid phase voltage may be determined. In this case, in block 78, an output power limit is activated and/or decreased. An output power limit of the electrical converter 12 may be decreased, when the maximal gain value is reached and the DC link voltage ripple 62 does not decrease below a threshold. The output power limit may be decreased to a suitable value (such as maximal 50%) so that the voltage ripple remains low enough. The power reduction also may be done to protect the capacitors.

When based on the function settings, in block 76, a fault is determined, in block 80, a fault is generated. A fault also may be generated, when the maximal gain value is reached and the DC voltage ripple 62 is still higher than the threshold of block 82.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practising the claimed invention, from a study of the drawings, the disclosure, and the appended claims. In the claims, the word "comprising" does not exclude other elements or steps, and the indefinite article "a" or "an" does not exclude a plurality. A single processor or controller or other unit may fulfil the functions of several items recited in the claims. The mere fact that certain measures are recited in mutually different dependent claims does not indicate that a combination of these measures cannot be used to advantage. Any reference signs in the claims should not be construed as limiting the scope.

LIST OF REFERENCE SYMBOLS 10 drive system
12 converter
14 electrical grid
16 electrical motor
18 rectifier
20 DC link
22 inverter
24 controller
26 current control stage
28 PWM control stage
30 DC link voltage signal
32 output voltage signal
33 speed reference
34 reference voltage
36 switching signals
38 DC link stabilizer
40 torque offset
42 digitizer block
44 notch filter block
46 low pass filter block
48 subtraction block
50 fluctuation signal
52 multiplier block
54 gain value
56 gain value adjuster block
58 enable/disable signal
60 ripple determination block
62 DC link voltage ripple
64 first threshold compare block
66 increase/decrease gain value block
68 maximal gain value compare block
70 maximal gain value setter block
72 second threshold compare block
74 check supply phase block
76 fault determination block
78 output power limiter block
80 fault generation block

The invention claimed is:
1. A method for stabilizing a DC link voltage of an electrical converter, the method comprising:
determining a DC link voltage signal for the DC link voltage of the electrical converter;
determining a fluctuation signal of the DC link voltage by applying a high pass filter to the DC link voltage signal;
determining a torque offset by multiplying the fluctuation signal with a gain value;
modifying a reference torque with the torque offset for controlling the electrical converter;

wherein the gain value is adjusted by:
  determining a DC link voltage ripple from the DC link voltage signal;
  comparing the DC link voltage ripple with a threshold and, when the DC link voltage ripple is higher than the threshold, increasing the gain value at least to a maximal gain value; and
  decreasing an output power limit of the electrical converter, when the maximal gain value is reached and the DC link voltage ripple does not decrease below a threshold.

2. The method of claim 1, further comprising checking, whether a supply of the DC link from an electrical grid is lost, when the maximal gain value is reached and the DC link voltage ripple does not decrease below the threshold.

3. The method of claim 2, further comprising:
when the supply is lost, generating a fault signal.

4. The method of claim 3,
wherein the DC link voltage ripple is determined by Fourier transforming the DC link voltage signal and summing a band of frequencies from the transformed DC link voltage signal.

5. The method of claim 4,
wherein the fluctuation signal of the DC link voltage is determined by additionally applying a notch filter to the DC link voltage signal, wherein the notch filter is adjusted to remove a higher order harmonic of the grid frequency generated by a rectifier supplying the DC link.

6. A method for controlling an electrical converter, the method comprising:
  determining an output voltage of the electrical converter;
  receiving a speed reference for an electrical machine supplied by the electrical converter;
  determining a torque reference from the speed reference and the output voltage;
  determining a torque offset by performing the acts of claim 1 and modifying the torque reference with the torque offset;
  controlling the electrical converter based on the modified torque reference.

7. The method of claim 6,
wherein a switching signal is determined from the torque reference based on pulse width modulation and applied to the electrical converter.

8. The method of claim 1, wherein the DC link voltage ripple is determined by Fourier transforming the DC link voltage signal and summing a band of frequencies from the transformed DC link voltage signal.

9. The method of claim 1, wherein the fluctuation signal of the DC link voltage is determined by additionally applying a notch filter to the DC link voltage signal, wherein the notch filter is adjusted to remove a higher order harmonic of the grid frequency generated by a rectifier supplying the DC link.

10. The method of claim 2, wherein the DC link voltage ripple is determined by Fourier transforming the DC link voltage signal and summing a band of frequencies from the transformed DC link voltage signal.

11. The method of claim 10, wherein the fluctuation signal of the DC link voltage is determined by additionally applying a notch filter to the DC link voltage signal, wherein the notch filter is adjusted to remove a higher order harmonic of the grid frequency generated by a rectifier supplying the DC link.

12. The method of claim 2, wherein the fluctuation signal of the DC link voltage is determined by additionally applying a notch filter to the DC link voltage signal, wherein the notch filter is adjusted to remove a higher order harmonic of the grid frequency generated by a rectifier supplying the DC link.

13. The method of claim 3, wherein the fluctuation signal of the DC link voltage is determined by additionally applying a notch filter to the DC link voltage signal, wherein the notch filter is adjusted to remove a higher order harmonic of the grid frequency generated by a rectifier supplying the DC link.

14. A computer program for stabilizing a DC link voltage and/or for controlling an electrical converter, which, when being executed by a processor, is adapted for stabilizing a DC link voltage of an electrical converter, comprising:
  determining a DC link voltage signal for the DC link voltage of the electrical converter;
  determining a fluctuation signal of the DC link voltage by applying a high pass filter to the DC link voltage signal;
  determining a torque offset by multiplying the fluctuation signal with a gain value;
  modifying a reference torque with the torque offset for controlling the electrical converter;
  wherein the gain value is adjusted by:
    determining a DC link voltage ripple from the DC link voltage signal;
    comparing the DC link voltage ripple with a threshold and, when the DC link voltage ripple is higher than the threshold, increasing the gain value at least to a maximal gain value; and
    decreasing an output power limit of the electrical converter, when the maximal pain value is reached and the DC link voltage ripple does not decrease below a threshold.

15. A controller for an electrical converter adapted for stabilizing a DC link voltage of an electrical converter, the controller comprising a processor in communication with a memory, and the processor programmed to:
  determine a DC link voltage signal for the DC link voltage of the electrical converter;
  determine a fluctuation signal of the DC link voltage by applying a high pass filter to the DC link voltage signal;
  determine a torque offset by multiplying the fluctuation signal with a gain value;
  modify a reference torque with the torque offset for controlling the electrical converter;
  wherein the gain value is adjusted by:
    determining a DC link voltage ripple from the DC link voltage signal;
    comparing the DC link voltage ripple with a threshold and, when the DC link voltage ripple is higher than the threshold, increasing the gain value at least to a maximal gain value; and
    decreasing an output power limit of the electrical converter, when the maximal gain value is reached and the DC link voltage ripple does not decrease below a threshold.

16. An electrical converter system, comprising:
a DC link with at least one capacitor;
an inverter for converting a DC link voltage in the DC link into an AC output voltage to be supplied to an electrical machine;
a controller according to claim 15 for controlling the inverter.

17. The electrical converter system of claim 16, further comprising:
   a rectifier for rectifying an AC voltage from an electrical grid into a DC voltage supplied to the DC link; and/or
   a rotating electrical machine supplied by the inverter.

\* \* \* \* \*